United States Patent [19]
Hessler et al.

[11] 3,910,719
[45] Oct. 7, 1975

[54] COMPRESSOR WHEEL ASSEMBLY

[75] Inventors: Barton H. Hessler, Shelton; Victor Strautman, Trumbull, both of Conn.

[73] Assignee: Avco Corporation, Stratford, Conn.

[22] Filed: Nov. 2, 1973

[21] Appl. No.: 412,391

[52] U.S. Cl. ............... 416/134; 416/219; 416/213; 416/241
[51] Int. Cl.² .......................................... F01D 5/30
[58] Field of Search ........... 416/134, 219, 213, 220, 416/241 A

[56] References Cited
UNITED STATES PATENTS

| | | | |
|---|---|---|---|
| 3,144,349 | 8/1964 | Swingler et al. | 416/241 A |
| 3,317,988 | 5/1967 | Endres | 416/219 |
| 3,758,232 | 9/1973 | Wallett | 416/213 |
| 3,784,320 | 1/1974 | Rossmann et al. | 416/219 X |

FOREIGN PATENTS OR APPLICATIONS

| | | | |
|---|---|---|---|
| 254,599 | 12/1962 | Australia | 416/134 |
| 528,068 | 8/1921 | France | 416/134 |
| 1,911,812 | 10/1969 | Germany | 416/134 |
| 1,110,217 | 4/1968 | United Kingdom | 416/241 A |

*Primary Examiner*—Everette A. Powell, Jr.
*Attorney, Agent, or Firm*—Charles M. Hogan; Irwin P. Garfinkle; Lawrence I. Field

[57] ABSTRACT

A compressor, intended for use in a gas turbine engine, comprises a disc with slots around the periphery which loosely receive the roots of the compressor blades. The gaps between the walls of the slots and the roots of the blades are filled with an adhesive composition so that after the composition has set, the blades are securely and precisely fastened.

1 Claim, 2 Drawing Figures

COMPRESSOR WHEEL ASSEMBLY

BACKGROUND OF THE INVENTION

The compressor made in accordance with this invention is intended for use in gas turbine engines. Normally such compressors must be manufactured with a high degree of precision and accuracy in order to obtain optimum performance and life. In accordance with the prior art, such manufacture requires precision machining of the various parts so that the parts can be assembled with close fitting tolerances. Such manufacturing techniques are costly and time consuming. This invention permits the manufacture of a gas turbine compressor using very wide tolerance components while the end product can be assembled with high precision and accuracy.

SUMMARY OF THE INVENTION

In essence, this invention provides for the casting or machining of a rotor disc with slots in the periphery configured to loosely receive the blade roots of the compressor blades. The gaps between the roots and the walls of the slots are then filled with an adhesive composition which, upon setting, precisely and securely positions the blades with respect to the discs so that optimum performance is obtainable.

THE DRAWINGS

FIG. 1 is a perspective view of a compressor made in accordance with this invention; and FIG. 2 is a cross section taken through the line 2—2 of FIG. 1.

DESCRIPTION OF THE ILLUSTRATED EMBODIMENT

Figure 1:
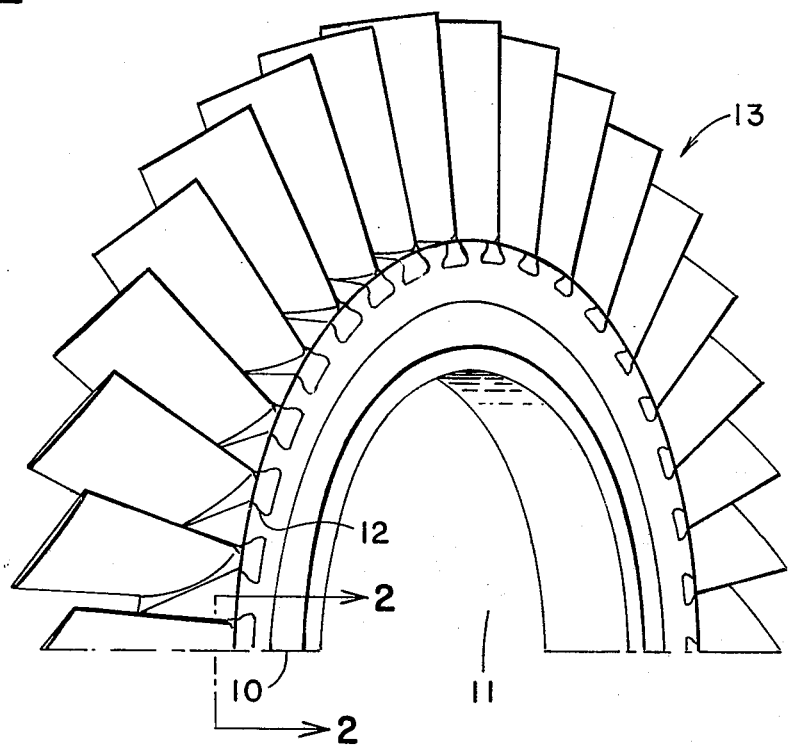
Figure 2:
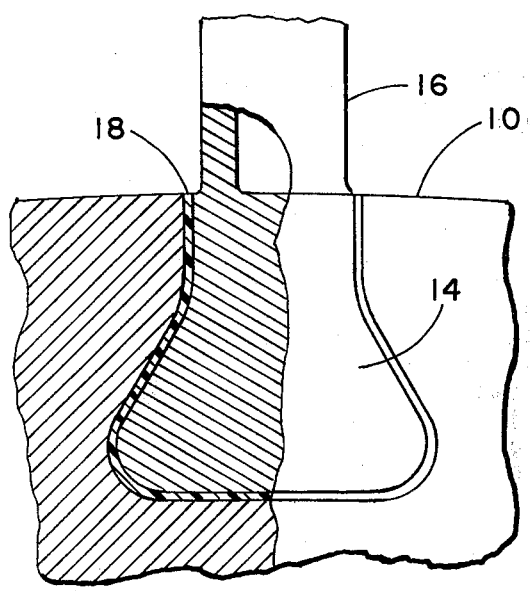

The illustrated embodiment of this invention is a rotary axial compressor wheel for a gas turbine engine. The compressor includes a metallic rotor disc 10 usually having a central aperture 11 through which the gas turbine shaft (not shown) extends and to which the disc is affixed. The disc 10 is manufactured with slots 12 in its periphery which are generally oriented in an axial direction. Metallic compressor blades 13, each having a root 14 and an airfoil section 16, are peripherally mounted on the disc 10. The slots 12 are configured to loosely contain the roots 14. It is the essence of this invention that the slots 12 and the roots 14 are cast or machined without close tolerances so that there is a loose fit between the blade roots and the walls of the slots, such that a substantial gap exists between the roots and the walls of the slots. The gap is filled with an adhesive composition 18.

Preferably the adhesive composition 18 comprises a resin containing various filler materials. Although the tolerances between the roots and the slots are very loose, the blades are precisely positioned and secured with respect to the disc when the gaps have been filled and the composition has set. The use of the adhesive composition 18 as hereinafter described provides an assembly capable of withstanding the transmission of the compressive stresses which occur during the operation of a gas turbine engine. Thus, this invention is capable of providing an assembly made of components having very wide tolerances, while the end product has a very precise positioning of all the parts, and has relatively high strength during normal operating conditions.

A suitable adhesive used in a practical embodiment of this invention is described in the application of Warren G. Phillips entitled "High Compressive Strength Adhesive", filed on the same day as this invention, Ser. No. 412,392. The adhesive described in the aforesaid Phillips application exhibits excellent properties in compression and is therefore of particular utility when used in conjunction with this invention. The adhesive composition taught in the Phillips application consists essentially of the following in parts by weight:

|  | Range | Preferred |
|---|---|---|
| Thermosetting Resin | 20–60 | 50 |
| Curing Agent |  | 50 |
| Accelerator |  | 0.5 |
| Thickening Agent |  | 3 |
| Filler | 80–40 | 50 |

One specific example of a suitable adhesive composition comprised an epoxy system including the following in parts by weight:

| | |
|---|---|
| Epoxy novolac resin (DEN 438) | 100 |
| Curing Agent-Nadic methyl anhydride | 100 |
| Accelerator - dimethylaminomethyl-phenol (DMP 30) | 1 |
| Thickening or Dispersing Agent-Fumed Silica | 6 |
| Filler - 1:1:1 mixture Al + $Al_2O_3$ + $Fe_3O_4$ | 200 |

Other resins which have been found suitable include Epon 154 (Shell), EPN 1138 (Ciba) and phenolic or polyimide resins, although epoxy novolac resins are preferred.

Suitable curing agents for each resin system are known and include a variety of organic anhydrides and other unsaturated compounds, and the same is true for the accelerator. The above composition was initially cured by heating to approximately 350°F and held at 350° for 1 hour. The assembly was then given a final post cure in a hot air oven at 400°F for 18 hours.

The function of the thickening agent is to maintain the filler particles dispersed uniformly throughout the composition. In the absence of any such additive, the filler particles tend to settle and the resulting composition then exhibits unequal strength properties. A preferred thickening agent is a silica sold by Cabot Corporation under the name Cab-O-Sil and believed to be a fume produced by burning $SiCl_4$.

In order to obtain the desired high compressive strength, the resin is filled with an equal weight of inorganic filler material, the same being a mixture of metals and metal oxides in specific proportions.

Utilizing the preferred proportions specified above, with the preferred resin, curing agent, accelerator and thickening agent, the following is a comparison of the room temperature compressive strengths obtained with individual fillers and with mixtures of fillers, tests being made on buttons 0.600 inches diameter and 0.250 inches thick:

| Filler: Resin Mixture (no filler) | Compressive Strength (ksi) |
|---|---|
| 0:1 | 40.5 |
| 1:1 $Al_2O_3$ (minus 320 mesh) | 48.4 |
| 1:1 $Fe_3O_4$ (minus 100 mesh) | 62.0 |
| 1:1 Al (minus 100 mesh) | 63.1 |
| 1:1 (1:1:1 mixture of $Al_2O_3$+$Fe_3O_4$+Al) | 78.1 |

From this it will be seen that a filler which comprises a mixture of both metals and metal oxides gives a stronger adhesive than the use of either filler alone.

Although equal proportions of the three preferred fillers have been found to be exceptionally effective, other proportions could be utilized as follows:

| FILLER | RANGES | EXAMPLE |
|---|---|---|
| Al | 10–35% | 20% |
| $Al_2O_3$ | 20–80% | 50% |
| $Fe_3O_4$ | 10–35% | 30% |

Other powdered metals may be substituted for the aluminum and other oxides may be used in place of those preferred, but the results obtained with such substituents are significantly inferior to the compressive strengths obtained with the preferred filler mixtures of Al, $Al_2O_3$ and $Fe_3O_4$.

While the illustrated blade presently appears to be the preferred construction for the bonded assembly, other blade configurations are also contemplated. For example the blade may comprise an airfoil section flash butt welded to the root, or the root may be a deformed extension of the airfoil reinforced with axial pins, or the root may be any other conventional structure or shape so long as it is mounted in accordance with the teaching of this invention. The invention has the advantage over the known prior art in that it eliminates the need for close tolerance machining of blade roots and disc slots. By using appropriate filled thermosetting resins to fill the gaps between the blade roots and disc slots, the blades are precisely bonded in position, and the severe stresses encountered in operation are transmitted from the blade to the disc.

We claim:

1. In a compressor for use in a gas turbine engine, the combination comprising:

a metallic rotor disc having a plurality of slots in the outer periphery thereof;

metallic compressor blades each having an airfoil section attached to a blade root, said roots being loosely positioned within said slots; and a thermosetting adhesive capable of withstanding the compressive stresses to which it is subjected during the operation of said gas turbine engine, filling the gap between said roots and the walls of said slots, said thermosetting adhesive comprising a resin filled with a mixture of aluminum, aluminum oxide and iron oxide, the ratio of said resin to said mixture being approximately 1:1 and the proportions of aluminum, aluminum oxide and iron oxide in said mixture being in the ranges of 10–35% Al, 20–80% $Al_2O_3$ and 10–25% $Fe_3O4$.

* * * * *

UNITED STATES PATENT OFFICE
CERTIFICATE OF CORRECTION

PATENT NO. : 3,910,719
DATED     : October 7, 1975
INVENTOR(S) : Barton H. Hessler et al.

It is certified that error appears in the above-identified patent and that said Letters Patent are hereby corrected as shown below:

Col. 2, line 63, delete "(no filler)".

Col. 2, line 64, "0:1" should read -- 0:1 (no filler) -- .

Col. 4, line 15, "roots" should read -- root -- .

Col. 4, line 27, "$Fe_3O4$" should read -- $Fe_3O_4$ -- .

Signed and Sealed this tenth Day of February 1976

[SEAL]

Attest:

RUTH C. MASON
Attesting Officer

C. MARSHALL DANN
Commissioner of Patents and Trademarks